(12) United States Patent
Wallrafen

(10) Patent No.: US 7,859,250 B2
(45) Date of Patent: Dec. 28, 2010

(54) SENSOR FOR MEASURING THE POSITION OF AN ACTUATOR

(75) Inventor: Werner Wallrafen, Hofheim (DE)

(73) Assignee: Continental Automotive GmbH, Hannover (DE)

( * ) Notice: Subject to any disclaimer, the term of this patent is extended or adjusted under 35 U.S.C. 154(b) by 582 days.

(21) Appl. No.: 11/572,364

(22) PCT Filed: Jun. 16, 2005

(86) PCT No.: PCT/EP2005/052794

§ 371 (c)(1), (2), (4) Date: Jan. 19, 2007

(87) PCT Pub. No.: WO2006/008217

PCT Pub. Date: Jan. 26, 2006

(65) Prior Publication Data

US 2007/0236223 A1   Oct. 11, 2007

(30) Foreign Application Priority Data

Jul. 19, 2004   (DE) .................. 10 2004 034 865

(51) Int. Cl.
*G01R 33/00* (2006.01)
*G01B 7/00* (2006.01)
*F02P 17/00* (2006.01)

(52) U.S. Cl. .................. 324/207.22; 324/378

(58) Field of Classification Search ............ 324/207.22, 324/207.25, 378; 73/514.31, 514.39
See application file for complete search history.

(56) References Cited

U.S. PATENT DOCUMENTS

| | | | |
|---|---|---|---|
| 4,491,921 A | 1/1985 | Sugiyama et al. ........... | 701/109 |
| 4,760,824 A | 8/1988 | Sakurai ................. | 123/339.15 |
| 5,482,019 A | 1/1996 | Ausiello et al. ............. | 123/361 |
| 6,339,322 B1 | 1/2002 | Loreck et al. ............... | 324/166 |
| 6,653,968 B1 | 11/2003 | Schneider ................... | 341/178 |
| 6,687,644 B1 | 2/2004 | Zinke et al. ................. | 702/145 |

(Continued)

FOREIGN PATENT DOCUMENTS

DE   195048222 C1   9/1996

(Continued)

OTHER PUBLICATIONS

Partial English Translation of JP2002-544511, Dec. 24, 2002.*

(Continued)

*Primary Examiner*—Bot L LeDynh
(74) *Attorney, Agent, or Firm*—King & Spalding L.L.P.

(57) ABSTRACT

A sensor measures the position of an actuator of an internal combustion engine, wherein the actuator is electromotively driven by means of a drive connection. The housing of the actuator accommodates at least one position sensor which detects the position at the drive connection. At least one position sensor is connected to a circuit with an operating voltage source and receives signals from at least one position sensor. The circuit and the at least one position sensor are connected via a cable that conducts voltage and signals. The circuit comprises also at least one current measuring device connected in series to the operating voltage source. A current change is transmitted via the cable by means of the signals generated by the at least one position sensor depending on the position of the actuator.

20 Claims, 3 Drawing Sheets

U.S. PATENT DOCUMENTS

| | | |
|---|---|---|
| 6,734,676 B2 | 5/2004 | Leipold et al. |
| 2002/0047704 A1 | 4/2002 | Apel .................. 324/207.2 |
| 2003/0113210 A1 | 6/2003 | Blass et al. ............... 417/212 |
| 2004/0129909 A1 | 7/2004 | Wiese |

FOREIGN PATENT DOCUMENTS

| | | |
|---|---|---|
| DE | 19634714 A1 | 3/1998 |
| DE | 19634715 A1 | 3/1998 |
| DE | 19650935 A1 | 6/1998 |
| DE | 19937155 A1 | 3/2001 |
| DE | 10116459 A1 | 11/2001 |
| EP | 1319820 A2 | 6/2003 |
| JP | 2004-011406 | 1/1992 |
| JP | 2006-042907 | 2/1994 |
| JP | 2002-544511 | 12/2002 |
| JP | 2003-510519 | 3/2003 |

OTHER PUBLICATIONS

International Search Report and Written Opinion for International Application No. PCT/EP2005/052794 (12 pages), Nov. 17, 2005.
International Preliminary Report for International Application No. PCT/EP2005/052794 (8 pages), Jan. 29, 2007.

* cited by examiner

SENSOR FOR MEASURING THE POSITION OF AN ACTUATOR

CROSS-REFERENCE TO RELATED APPLICATIONS

This application is a U.S. national stage application of International Application No. PCT/EP2005/052794 filed Jun. 16, 2005, which designates the United States of America, and claims priority to German application number DE 10 2004 034 865.0 filed Jul. 19, 2004, the contents of which are hereby incorporated by reference in their entirety.

TECHNICAL FIELD

The invention relates to a sensor for measuring the position of an actuator, which is electromotively operated via a drive connection, of an internal combustion engine, at least one position sensor being arranged in the housing of the actuator, which position sensor detects the position at the drive connection.

BACKGROUND

Extremely stringent requirements in terms of reliability are placed on sensors of this type since faulty functioning or failures may also present hazards under certain circumstances. This relates both to the sensor itself and to the electrical connections between the sensor and the circuits which supply the sensor with operating voltage and receive and evaluate the output signals from the sensor.

In this case, the cable connections and contact points used for this purpose may represent origins of faults which may lead to serious faults even in the case of a double configuration of the sensors and the connecting elements for redundancy reasons in safety-relevant systems. In addition, owing to the increasing introduction of electronic devices in motor vehicles the number of cable connections in increasing continuously, in which case laying many lines is disadvantageous for cost and weight reasons.

SUMMARY

The object of the present invention is to specify a sensor of the type mentioned at the outset which is characterized by a high degree of reliability and low costs.

This object can be achieved by virtue of the fact that at least one position sensor is connected to a circuit, which contains an operating voltage source and receives signals from the at least one position sensor, that the connection between the circuit and the at least one position sensor takes place via a voltage- and signal-carrying line, that at least one current measuring device is connected in series with the operating voltage source in the circuit, and that a current change is transmitted over the line via the signals from the at least one position sensor depending on the position of the actuator.

BRIEF DESCRIPTION OF THE DRAWINGS

Exemplary embodiments of the invention are illustrated in the drawing using a plurality of figures and explained in more detail in the description below. In the drawing.

DETAILED DESCRIPTION

Figure 1:
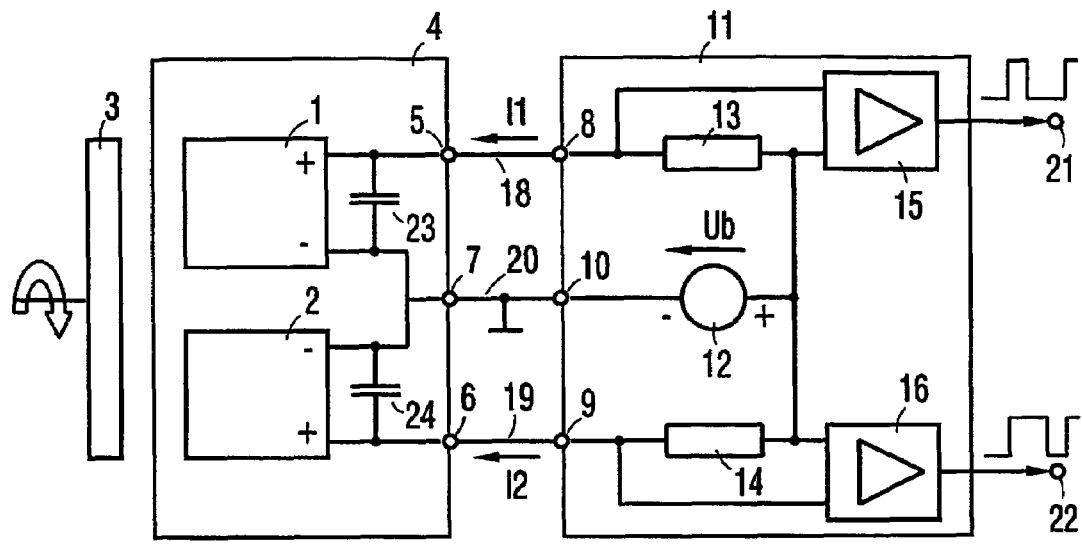
FIG. 1 shows a block circuit diagram of a first exemplary embodiment.

In an embodiment, the sensor can be advantageously protected from external influences. The sensor itself and line connections up to a plug-in apparatus are more robust and can nevertheless be produced inexpensively. In addition, the number of lines required is reduced in comparison with known sensors.

According to an embodiment, the current change can be binary with one current level and another current level, the one current level corresponding to the current flowing through a voltage stabilization circuit in at least one position sensor and through the operating voltage source, and another current level corresponding to the current increased by a load, which can be connected as a function of the signals, in the position sensor.

Apart from the savings made on lines, this embodiment has the advantage that the transmission safety at the contacts is increased by virtue of the fact that the current through the contacts does not exceed a critical minimum value. As a result, in most cases it is possible to dispense with gold-plating of the contacts. Furthermore, transfer resistances at lines and contacts do not result in signal changes, as is known in similar signal transmissions.

According to an embodiment, the binary output signals can be encoded in a respectively expedient manner, for example pulse width-modulated, frequency-modulated, Manchester-encoded or using other serial transmission methods. According to an embodiment, the output signals can not only include the output variables of the position sensor but also other data, such as diagnostic and/or temperature data. According to an embodiment, the position sensors themselves may be Hall sensors or function on a magnetoresistive or inductive basis.

In comparison with interfaces with analog signals, the interface provided in accordance with this embodiment has the advantage of a higher degree of safety from interference signals. In addition, savings are made in terms of the analog-to-digital conversion. In addition, reverse polarity protection and overvoltage protection can be realized more easily since no ratiometric analog signal is used.

According to an embodiment, in the case of a plurality of position sensors, the dependence of the signals on the position of the actuator can be different from position sensor to position sensor. This measure is used for safety reasons for the case in which the lines of the two position sensors are short-circuited and this cannot be identified in the circuit.

According to an embodiment, two position sensors can be connected to the circuit via in each case two lines, and one current measuring device is provided per position sensor. According to another embodiment, the device can be designed, given reduced redundancy, but also given a lower degree of outlay on materials, such that two position sensors are connected to the circuit via in each case one line and a common line, and that, one current measuring device is provided per position sensor.

In these embodiments, provision is essentially made for two sensors to be used, in the case of four lines—in comparison with six lines using conventional technology—a very high degree of system availability being provided since, in each theoretical fault case, the system can continue to be operated on one channel (sensor+lines).

In addition, with the device according to an embodiment provision is preferably made for a common movable element for detecting the position to be associated with the position sensors.

Another advantageous configuration of the device according to an embodiment consists in the fact that the current measuring device is formed by a current measuring resistor and a threshold value circuit.

Particularly reliable and mechanically robust embodiments result from the fact that the position sensors are each in the form of an integrated circuit with two connection pins, which are welded to a lead frame, which is embedded in a plastic cover of the housing. Two connection pins can be welded more reliably in automated processes than three or more connection pins.

The electromagnetic compatibility can be improved with the device according to an embodiment by virtue of the fact that the connections, which are provided for the lines, of the at least one position sensor are connected to one another, preferably in the vicinity of the position sensor, by a capacitor. In this case, it is advantageous if the capacitor, together with the position sensor, has plastic injected around it.

One further advantage of the two-wire connection consists in the saving made on an additional capacitor, which is provided in analog sensors for feeding the supply voltage.

In the exemplary embodiments, two position sensors 1, 2 are used in order to measure the position of a movable object 3—for example a magnet. Two position sensors are used for increasing the reliability when measuring the position of safety-relevant apparatuses, for example the throttle valve of a motor vehicle engine. The position sensors have a plastic sheathing 4 injected around them, as one module. They each have a connection 5, 6 and a common connection 7. Lines 18, 19, 20 are used for the connection to corresponding connections 8, 9, 10 of a circuit 11, which will also be referred to as the evaluation circuit below. The evaluation circuit contains an operating voltage source 12, which is connected to the connections 8, 9 and therefore to the lines 18, 19 in each case via a current measuring resistor 13, 14. The voltage drop across the measuring resistors 13, 14 is passed to amplifiers 15, 16 having a threshold value characteristic and hysteresis, at whose outputs 21, 22 signals are made available for further use.

The connections of the position sensors 1, 2 are bridged by in each case one capacitor 23, 24 in order to filter radiofrequency irradiation. Said capacitors 23, 24 are dimensioned such that the output signals produced by the position sensors 1, 2 are not impaired.

Figure 2:
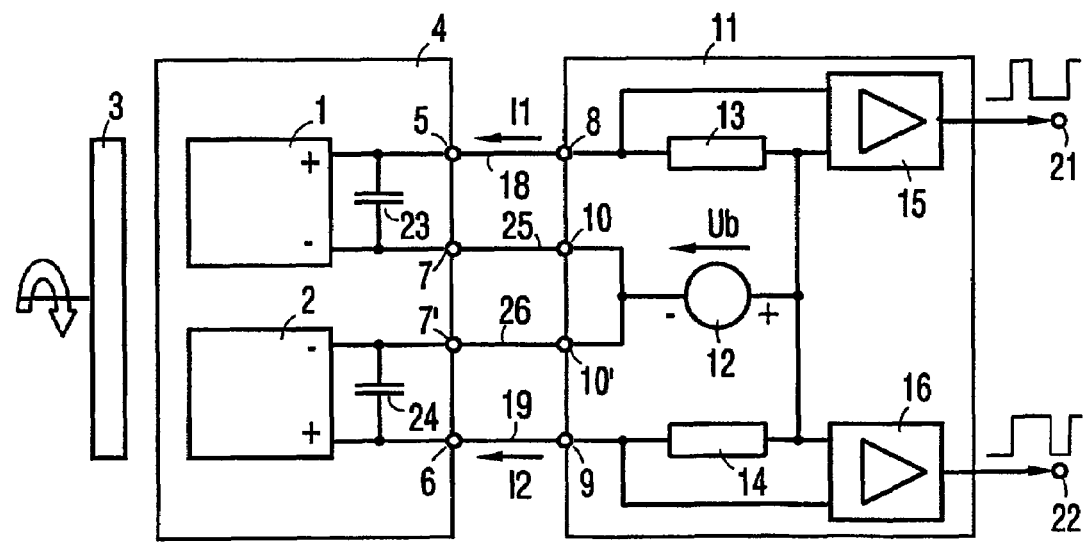
FIG. 2 shows a second exemplary embodiment.

The device shown in FIG. 2 differs from that shown in FIG. 1 by virtue of the fact that, instead of a common line 20 (FIG. 1), in each case one line 25, 26 is used per position sensor, which line is connected to the position sensors 1, 2 or the circuit 11 via connections 7, 10 or 7', 10'. As a result, although the complexity is increased, in the event of a fault in any line, the respective other position sensor is still fully functional.

Figure 3:
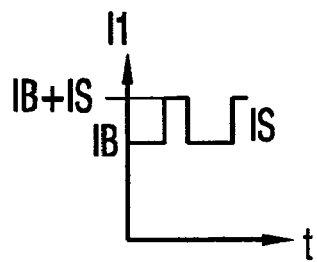
FIG. 3 and FIG. 4 show timing diagrams of the currents flowing in the lines.
Figure 4:
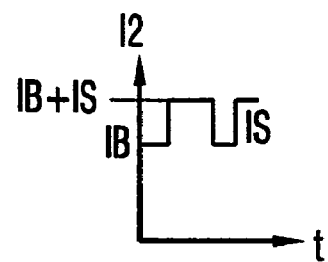

FIGS. 3 and 4 show the profile of the currents I1 and I2, which each comprise a constant component IB, which is required for operating the position sensor, and a pulsating component IS, which corresponds to the amplitude of the output signal.

Figure 5:
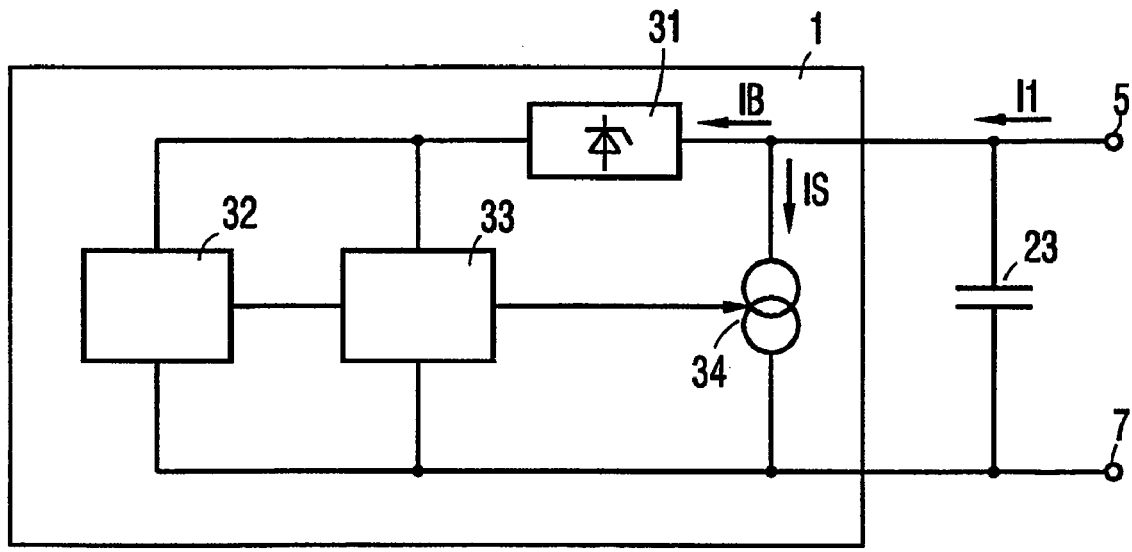
FIG. 5 shows a more detailed circuit diagram of a position sensor.

FIG. 5 shows the position sensor 1 in a slightly more detailed illustration. The current IB passes from the connection 5 to the voltage stabilization circuit 31, which supplies the actual sensor 32 and a signal conditioning circuit 33. This signal conditioning circuit produces a signal which is suitable for driving a current drain 34 and connects, in pulsating fashion, the current IS to the operating current IB.

Figure 6:
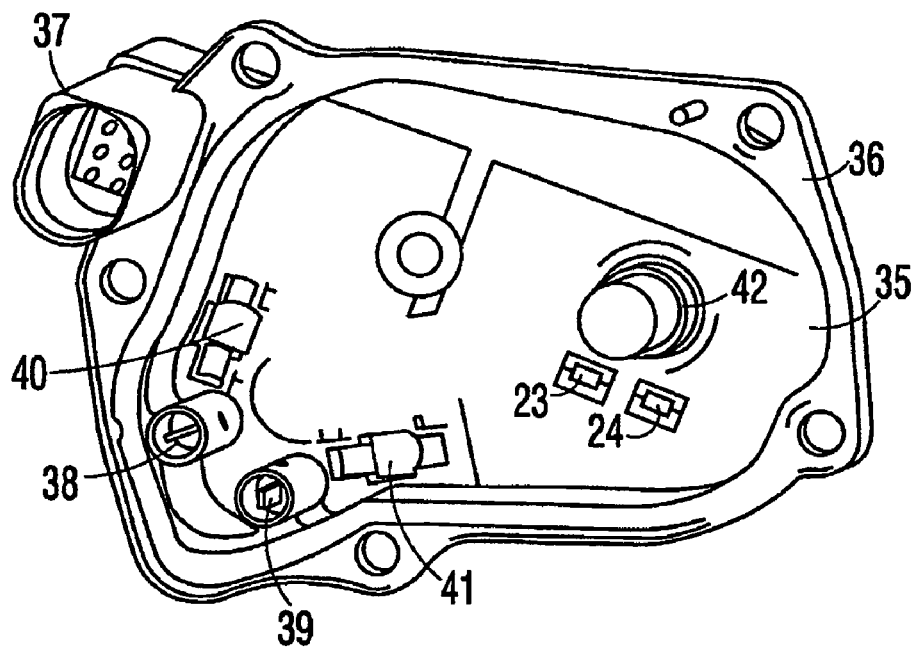
FIG. 6 shows the cover of an electromotively operated actuator.

FIG. 6 shows the cover 35 of a throttle valve housing (not illustrated). The cover 35 is screwed to the housing by a flange 36. A multiway plug-in apparatus 37 is integrally formed on the cover 35. In addition, two plug-in connectors 38, 39 are located on the cover 35 which, in the closed state of the housing, form a connection between the servomotor and the plug-in apparatus 37 via interference suppression means 40, 41. These interference suppression means are embedded in the plastic cover 35, as are lines in the form of a lead frame between the plug-in apparatus 37 and the interference suppression means 40, 41.

Figure 7:
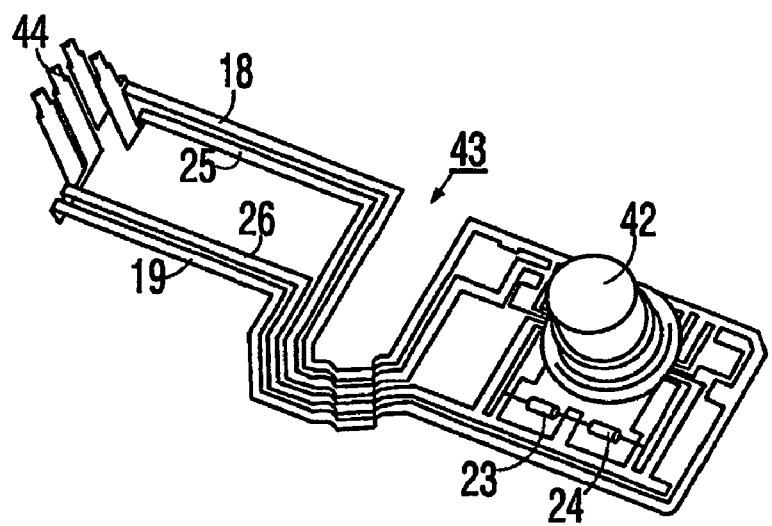
FIG. 7 shows a lead frame embedded in the cover.

A sensor head 42 is arranged in the cover 35 aligned with the drive connection (not illustrated) of the throttle valve, which sensor head contains two position sensors and is likewise connected to the plug-in apparatus 37 by lines 18, 19, 25, 26, which are formed by a lead frame 43 (FIG. 7). The lead frame 43 at the same time forms contact pins 44 of the plug-in apparatus 37. The capacitors 23, 24 are not illustrated with plastic injected around them in FIG. 6. Given corresponding requirements, it is also possible, however, for the capacitors to have plastic injected around them.

What is claimed is:

1. A sensor arrangement for measuring the position of an actuator, which is electromotively operated via a drive connection, of an internal combustion engine, the sensor arrangement having at least a first position sensor and a second position sensor each connected to a circuit, the first and second position sensors being arranged in a housing of the actuator and detecting the position at the drive connection, the circuit containing an operating voltage source and receiving signals from the first and second position sensors, the connection between the circuit and each of the first and second position sensors taking place via at least one line, the lines carrying operating voltage for the first and second position sensors and signals, a first current measuring device and a second current measuring device, each being connected in series with the operating voltage source in the circuit, and current changes being transmitted over the lines via the signals from the first and second position sensors depending on the position of the actuator.

2. The sensor according to claim 1, wherein the current change transmitted by each position sensor is binary with one current level and another current level, the one current level corresponding to the current flowing through a voltage stabilization circuit in that position sensor and through the operating voltage source, and another current level corresponding to the current increased by a load, which can be connected as a function of the signals, in that position sensor.

3. The sensor according to claim 1, wherein the dependence of the signals on the position of the actuator is different for the first and second position sensors.

4. The sensor according to claim 1, wherein each position sensors is connected to the circuit via two lines.

5. The sensor according to claim 1, wherein each position sensors is connected to the circuit via one line and a common line shared by the first and second position sensors.

6. The sensor according to claim 4, wherein a common movable element for detecting the position is associated with the position sensors.

7. The sensor according to claim 1, wherein each current measuring device is formed by a current measuring resistor and a threshold value circuit.

8. The sensor according to claim 1, wherein the position sensors are each in the form of an integrated circuit with two connection pins, which are welded to a lead frame, which is embedded in a plastic cover of the housing.

9. The sensor according to claim 1, wherein the connections, which are provided for the lines, of each position sensor are connected to one another by a capacitor.

10. The sensor according to claim 9, wherein the capacitor, together with the respective position sensor, has plastic injected around it.

11. A method for measuring the position of an actuator, which is electromotively operated via a drive connection, of an internal combustion engine, the method comprising the steps of:

detecting the position at the drive connection by each of a first position sensor and a second position sensor, receiving signals from the first and second position sensors via at least one line, the lines carrying an operating voltage for the first and second position sensors and said signals, and using a first current measuring device connected to the first position sensor and a second current measuring device connected the the second position sensor to measure current changes being transmitted over the lines via the signals from the first and second position sensors depending on the position of the actuator.

12. A method for measuring the position of an actuator, which is electromotively operated via a drive connection, of an internal combustion engine, the method comprising the steps of:

detecting the position at the drive connection by a position sensor, receiving signals from the at least one position sensor via a line, which carries an operating voltage for the at least one position sensor and said signals, and measuring a current change being transmitted over the line via the signals from the at least one position sensor depending on the position of the actuator, wherein the current change is binary with one current level and another current level, the one current level corresponding to the current flowing through a voltage stabilization circuit in at least one position sensor and through an operating voltage source, and another current level corresponding to the current increased by a load, which can be connected as a function of the signals, in the position sensor.

13. The method according to claim 11, wherein the dependence of the signals on the position of the actuator is different for the first and second position sensors.

14. The method according to claim 11, wherein each position sensors is connected to a circuit via two lines.

15. The method according to claim 11, wherein each position sensors is connected to a circuit via one line and a common line shared by the first and second position sensors.

16. The method according to claim 14, wherein a common movable element for detecting the position is associated with the position sensors.

17. The method according to claim 11, wherein each current measuring device is formed by a current measuring resistor and a threshold value circuit.

18. The method according to claim 11, wherein the position sensors are each in the form of an integrated circuit with two connection pins, which are welded to a lead frame, which is embedded in a plastic cover of a housing.

19. The method according to claim 11, wherein connections, which are provided for the lines, of each position sensor are connected to one another by a capacitor.

20. The method according to claim 19, wherein the capacitor, together with the respective position sensor, has plastic injected around it.

* * * * *